Figure 1:
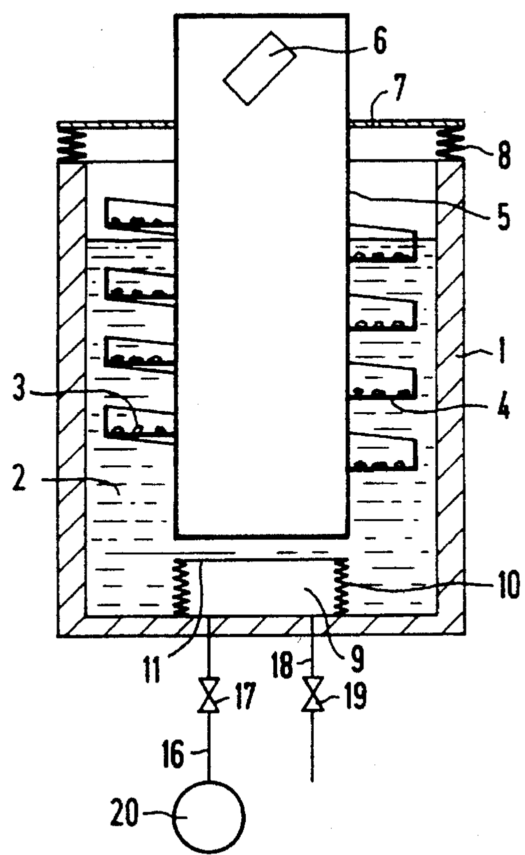

US005496456A

United States Patent [19]

Fischer et al.

[11] Patent Number: 5,496,456

[45] Date of Patent: Mar. 5, 1996

[54] VIBRATING CONVEYOR DEVICE DIPPING INTO A LIQUID WITH DAMPING OF VIBRATION TRANSMISSION

[75] Inventors: Jürgen Fischer, Bergisch Gladbach; Siegfried Birkle, Höchstadt/Aisch; Werner Elsel, Erlangen; Johann Gehring, Spardorf; Arnolf Maurer, Bubenreuth; Waldemar Nippe, Erlangen, all of Germany

[73] Assignee: Siemens Aktiengesellschaft, Munich, Germany

[21] Appl. No.: 447,902

[22] Filed: May 23, 1995

Related U.S. Application Data

[63] Continuation of Ser. No. 192,187, Feb. 4, 1994, abandoned, which is a continuation of Ser. No. 755,671, Sep. 6, 1991, abandoned.

[30] Foreign Application Priority Data

Mar. 6, 1989 [DE] Germany .......................... 39 07 147.2

[51] Int. Cl.$^{6}$ ............................ B65G 27/02; C25D 17/16

[52] U.S. Cl. .......................... 204/201; 198/756; 198/760; 205/145

[58] Field of Search .................................... 204/201, 222; 205/128, 145; 198/756, 757, 760

[56] References Cited

U.S. PATENT DOCUMENTS

| | | | |
|---|---|---|---|
| 2,985,281 | 5/1961 | Carrier | 198/756 |
| 3,115,239 | 12/1963 | Wright | 198/757 |
| 3,347,374 | 10/1967 | Frei | 209/332 |
| 4,670,120 | 6/1987 | Birkle et al. | 204/201 |
| 4,701,248 | 10/1987 | Birkle et al. | 204/201 |

FOREIGN PATENT DOCUMENTS

| | | |
|---|---|---|
| 525480 | 1/1954 | Belgium . |
| 0209766 | 1/1987 | European Pat. Off. . |
| 1130649 | 5/1962 | Germany . |
| 3524488 | 1/1987 | Germany . |
| 1497304 | 1/1978 | United Kingdom . |

*Primary Examiner*—John Niebling
*Assistant Examiner*—William T. Leader
*Attorney, Agent, or Firm*—Herbert L. Lerner; Laurence A. Greenberg

[57] ABSTRACT

Known large vibrating conveyors are not readily suitable as such for conveying bulk materials or small articles into or out of a liquid bath, because the liquid transmits the vibrations to other structural parts, for example a vessel for the liquid, as a result of the incompressibility of the liquid. In order to remedy this, the vibrating conveyor device according to the invention has a compressible space or chamber underneath the vibrating part which damps the vibrations, when suitably coordinated with the liquid bath. The space is preferably gas-filled and its damping properties can be varied by feeding additional gas through a line which can be shut off by a member, or by bleeding some of the filling through a further line which can likewise be shut off by a member.

12 Claims, 1 Drawing Sheet

6
7
8
5
1
4
3
2
10
11
18
9
17
19
16
20

VIBRATING CONVEYOR DEVICE DIPPING INTO A LIQUID WITH DAMPING OF VIBRATION TRANSMISSION

CROSS-REFERENCE TO RELATED APPLICATIONS

This application is a continuation, of application Ser. No. 08/192,187, filed Feb. 4, 1994, now abandoned, which is a continuation of application Ser. No. 07/755,671, filed on Sep. 6, 1991, now abandoned.

The invention relates to a vibrating conveyor device for bulk materials, such as small articles, which dips at least partially into a liquid partly filling a vessel.

Vibrating conveyor devices are often used for conveying bulk materials, for example granular materials or even small articles, such as screws and nuts that behave in a similar way to bulk materials, from a lower to a higher level. Such known conveyors devices work in air and the vibrations are only slightly transmitted to the foundations.

An aim of the invention is also to employ vibrating conveyor devices in electroplating installations, in which articles of the most diverse kinds, even small articles, are provided with an aluminum layer for protecting them against corrosion. For this purpose, the vibrating conveyor devices must dip at least partially into the electrolyte or into cleaning fluids.

Such a vibrating conveyor device is known from Published European Application No. 0 209 766 A1. In that device, a conveyor track is fastened to a vibrating central column which is sealed off by means of a bellows and passes through the wall of the vessel. The bellows performs only a sealing, but not a damping function. It has been shown that, because of the incompressibility of the liquid, the vibrations of the conveyor device are then transmitted to a considerable degree to the vessel containing the liquid and to the foundations. Where relatively small vibrating conveyor devices are concerned, the above-described disadvantages are usually insignificant. At the transition from smaller vibrating conveyor devices used in test installations to those of larger dimensions and higher performance, such as are needed in production installations, the transmitted forces are so high that damping becomes necessary.

It is accordingly an object of the invention to provide a vibrating conveyors device dipping into a liquid with a damping of vibration transmission, which overcomes the hereinafore-mentioned disadvantages of the heretofore-known devices of this general type and which improves the vibrating conveyor devices disposed in a liquid, to such an extent that the transmission of vibrations to the stationary parts of the installation is markedly reduced.

With the foregoing and other objects in view there is provided, in accordance with the invention, a vibrating conveyor assembly for bulk materials, such as small articles, comprising a vessel, a liquid partly filling the vessel up to a given liquid level, a vibrating conveyor device dipping at least partially into the liquid, a chamber being disposed in the vessel below the given liquid level and having a volume which is variable as a function of vibrations exerted by the liquid and acting on the chamber.

The liquid column which is excited to vibrate as a result of the vibration of the conveyor then transmits its vibrations only to a highly damped extent because the transmission chain has a sufficiently compressible link.

In accordance with another feature of the invention, the chamber volume varying means includes means for varying a degree of variability of the volume of the chamber for a given change in pressure transmitted by the liquid.

This makes it possible to coordinate the degree of compressibility of this link to the particular vibration behavior of the respective conveyor, which is accessible to computation to only a limited extent and which is dependent on a plurality of factors. This can be obtained by varying the prestress imparted to the compressible link, which may be a spring or a gas volume, as will be further explained below.

In accordance with a further feature of the invention, the chamber has flexible walls made of an elastic material.

In accordance with an added feature of the invention, the vessel has a bottom, and the chamber is a closed bellows disposed on the bottom of the vessel.

The chamber thus described, which is constructed according to the first possibility mentioned above, can be evacuated, so that the required flexibility and elasticity has to be provided by the chamber wall itself. However, in accordance with an additional feature of the invention, the chamber is gas-filled. The gas itself reacts elastically.

In accordance with an additional feature of the invention, the chamber is a gas-filled bell dipping into the liquid and forming part of the vibrating conveyor device.

In accordance with yet another feature of the invention, the chamber is a gas-filled balloon dipping into the liquid, and there is provided a retaining device preventing the gas-filled balloon from rising.

These two last-mentioned embodiments provide the second possibility mentioned above. In the former embodiment, the damping is obtained solely by means of the gas, while the walls of the chamber (opening downwards in this case) can be made rigid. In the construction according to the latter embodiment, the damping is likewise obtained solely by the gas-filled space, while its border itself which is made of a plastic film, for example, contributes nothing to this.

In accordance with yet a further feature of the invention, a means for varying a degree of variability of the volume of the chamber includes a gas supply connected to the chamber, and preferably an adjusting member connected to the gas supply.

This structure is aimed at making it possible to vary the pressure prevailing in a gas-filled chamber in the state of rest of the conveyor device, so that, as indicated above, on one hand the damping properties can be adapted to the conditions which are specific to each installation and on the other hand the damping is matched to the operating modes of the vibrating conveyor which differ according to the particular material to be conveyed.

In accordance with a concomitant feature of the invention, the liquid is an electroplating or cleaning bath, and the vibrating conveyor device has means for conveying bulk materials out of and into the bath. Other features which are considered as characteristic for the invention are set forth in the appended claims.

Although the invention is illustrated and described herein as embodied in a vibrating conveyor device dipping into a liquid with a damping of vibration transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
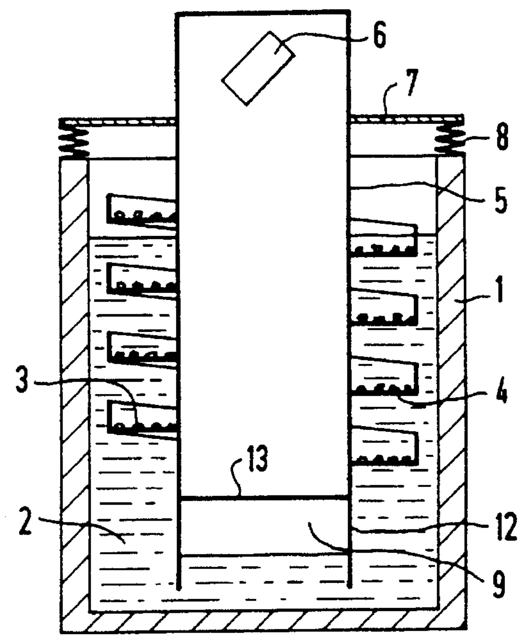
Figure 3:
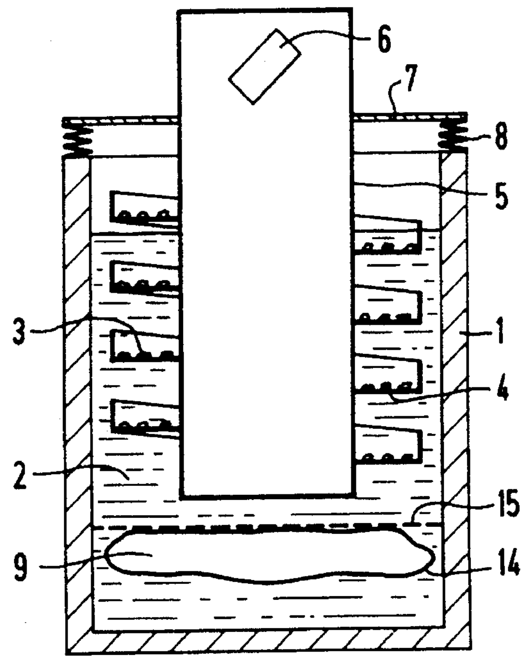

FIGS. 1, 2 and 3 are diagrammatic, axial longitudinal-sectional views illustrating exemplary embodiments of the invention.

Referring initially to all of the figures of the drawings as a whole, it is seen that common to all of the exemplary embodiments is a vessel 1 which for the most part is filled with a liquid 2, for example with an electroplating bath, in which small articles 3, for example screws, are provided with an aluminum coating for protecting against rust. However, the bath 2 may also be a cleaning bath. In the part of the installation shown diagrammatically herein, the small articles 3 are brought out of the liquid to a level above the liquid by means of a vibrating conveyor. For this purpose, they are disposed on a conveyor track 4 extending helically around a central cylinder 5, inside of which an unbalance motor 6 is disposed for generating the vibrations. The power supply, etc. of the unbalanced motor 6 is not shown in this case for the sake of clarity. Since electroplating processes of the type described have to be carried out with the exclusion of air, the central cylinder 5 is inserted into a cover 7 which covers the vessel 1 and which is connected to the vessel by an elastic sealing bellows 8.

When the vibrating conveyor is in operation, the liquid 2 vibrates together with the conveyor and would lead to considerable loads on the installation, especially at the wall of the vessel 1 and the parts directly coupled thereto, if a space 9 which is not filled with liquid were not disposed underneath the vibrating central cylinder 5. This space can be formed by a further bellows 10 which is closed at its top or upper end by means of a cover 11 shown in FIG. 1. The space 9 can be evacuated, in which case the bellows 10 assumes a damping function alone, or else it can be gas-filled, as in the other two illustrated exemplary embodiments. The vessel 1 can also have a non-illustrated orifice in the vicinity of the bellows 10, so that the space 9 is connected to the ambient atmosphere.

In the exemplary embodiment shown in FIG. 2, the space 9 is defined by a skirt or bell 12 connected to the central cylinder 5 and by a partition wall 13.

According to the embodiment of FIG. 3, it is also possible to employ a gas-filled bag or balloon 14 which is maintained in its position below the liquid level by means of a retaining device 15, for example a grid.

The degree of filling of the spaces 9 with a gas (preferably an inert gas, such as nitrogen, in order to prevent reactions with the liquid 2) can be varied, as shown in Fig. 1. Gas can be conveyed into the space 9 from a vessel 20, through a first line 16 which can be shut off by means of a first valve 17. Gas can be bled through a second line 18 which can be shut off by means of a second valve 19. This is done in order to increase the elasticity of the gas cushion or conversely to reduce it, depending on the construction and operating state (for example, depending on the filling height of the liquid 2 or the vibration amplitude of the central cylinder 5).

A similar non-illustrated device can be used in the exemplary embodiment according to FIG. 2 for the purpose of compensating any gas losses from the space 9 (caused by bubbles separating off from the gas cushion as a result of the vibrations and bypassing the skirt 12).

We claim:

1. In a vibrating conveyor assembly for conveying bulk materials comprising a vessel, a liquid partly filling said vessel to a given liquid level, and a vibrating conveyor device dipping into the liquid, the improvement which comprises:

means disposed in said vessel below the liquid level for damping vibrations caused by the vibrating conveyor device and transmitted through the liquid, said damping means comprising a chamber having a volume which is variable as a function of vibrations exerted by the liquid and acting on said chamber.

2. The assembly according to claim 1, wherein said means for damping include means for varying a degree of variability of the volume of said chamber for a given change in pressure transmitted by said liquid.

3. The assembly according to claim 2, wherein said means for varying a degree of variability includes a gas supply connected to said chamber.

4. The assembly according to claim 3, wherein said gas supply includes an adjusting member connected thereto.

5. The assembly according to claim 1, wherein said chamber has flexible walls made of an elastic material.

6. The assembly according to claim 5, wherein said vessel has a bottom, and said chamber is a closed bellows disposed on the bottom of said vessel.

7. The assembly according to claim 6, wherein said chamber is gas-filled.

8. The assembly according to claim 6, wherein said chamber is gas-filled.

9. The assembly according to claim 1, wherein said chamber is a gas-filled bell and forms part of said vibrating conveyor device.

10. The assembly according to claim 1, wherein said chamber is a gas-filled balloon and includes retaining device preventing said gas-filled balloon from rising.

11. The assembly according to claim 1, wherein said liquid is an electroplating bath, and said vibrating conveyor device has means for conveying bulk materials out of and into said electroplating bath.

12. The assembly according to claim 1, wherein said liquid is a cleaning bath, and said vibrating conveyor device has means for conveying bulk materials out of and into said cleaning bath.

* * * * *